(12) United States Patent
Cai et al.

(10) Patent No.: US 9,584,516 B2
(45) Date of Patent: Feb. 28, 2017

(54) PROXY AUTHENTICATION FOR A MULTIPLE CORE NETWORK DEVICE

(71) Applicant: DELL SOFTWARE INC., Round Rock, TX (US)

(72) Inventors: Riji Cai, Pudong New Area (CN); Zhong Chen, San Jose, CA (US)

(73) Assignee: Quest Software Inc., Aliso Viejo, CA (US)

( * ) Notice: Subject to any disclaimer, the term of this patent is extended or adjusted under 35 U.S.C. 154(b) by 202 days.

(21) Appl. No.: 14/605,731

(22) Filed: Jan. 26, 2015

(65) Prior Publication Data

US 2016/0219052 A1 Jul. 28, 2016

(51) Int. Cl.
*H04L 9/00* (2006.01)
*H04L 29/06* (2006.01)

(52) U.S. Cl.
CPC ........ *H04L 63/0884* (2013.01); *H04L 63/102* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,584,209 | B1* | 11/2013 | Borapura | H04L 63/162 370/254 |
| 8,761,101 | B1* | 6/2014 | Crosbie | H04W 4/005 370/230 |
| 9,177,313 | B1* | 11/2015 | Silverman | G06Q 40/00 |
| 9,356,921 | B2* | 5/2016 | Kanov | H04L 63/08 |
| 9,450,784 | B2* | 9/2016 | Schmidt | H04L 12/6418 |
| 2006/0271781 | A1* | 11/2006 | Murakawa | G06F 21/31 713/168 |

* cited by examiner

*Primary Examiner* — Beemnet Dada
(74) *Attorney, Agent, or Firm* — Polsinelli LLP

(57) ABSTRACT

The present invention is generally related to a network computing device including a first processor communicating with a second processor as a proxy for a client device when authenticating access privileges of the client device. The present invention may include more than two processors where at least one of the multiple processors may be optimized for performing one or more control functions and one or more other processors may be optimized for transferring data or administrating the transfer of data through a gateway or firewall.

15 Claims, 3 Drawing Sheets

PROXY AUTHENTICATION FOR A MULTIPLE CORE NETWORK DEVICE

BACKGROUND OF THE INVENTION

Field of the Invention

The present invention is generally related to a network computing device including a first processor communicating with a second processor as a proxy for a client device when authenticating access privileges of the client device. More specifically, the present invention relates to the first processor running software to communicate with the second processor as if it were a client device where the software running on the first processor does not validate the authenticity of the client device.

Description of the Related Art

Client devices attempting to gain access to a resource in a networked computing environment are commonly authenticated before being allowed to access data or programs stored at the resource. A client device commonly gains access to a specific resource after sending a request to access the resource and after credentials of the client device have been authenticated.

The authentication of credentials from a client device may include communications between the client device, a gateway or firewall, and an authentication server. After an authentication process has been completed, the gateway or firewall may allow the client device to communicate with a computing resource in a networked computing environment. The computing resource may be a computer or a server that is distinct from the authentication server that was communicated with during the authentication process of the client device.

Information used to authenticate the credentials of a client device may include, yet are not limited to a password, a user name, a security certificate, or other information provided by the client device. The authentication information provided by the client device may be compared with information at or provided by an authentication server. A gateway or firewall located between the client device and the authentication server may also perform an authentication process where credentials of a server or a client device may be authenticated. In some configurations, a gateway or firewall may act as the authentication server itself.

When additional security is desired the authentication of a client device may be performed after a secure socket layer (SSL) communication session has been established. The authentication of the credentials of a client device may therefore be performed with our without establishing an SSL communication session. When an SSL communication session is used, it is commonly established after establishing a transmission control protocol (TCP) session between a client device and a computing device.

Today computing devices including gateways and firewalls commonly include multiple processors (i.e., a multi-processor) where at least one of the multiple processors may be optimized for performing one or more control functions. In these systems one or more other processors may be optimized from transferring data between a client device and a computing resource. The functionality of a processor optimized for transferring data, i.e. a data plane (DP) processor, may process the movement of data (i.e., data traffic) according to a set of access rule or other settings that may be configured by a processor optimized for control functions, i.e. a control plane (CP) processor.

Frequently data passing through a gateway or a firewall is administrated by a one or more DP processors. The communication of data through the gateway or firewall may be optimized by using software that is designed to transfer data that includes little or no program code for performing control functions. Similarly, software optimized for performing control functions includes little or no program code that optimizes the transfer of data through the gateway or firewall. CP processors may include a full set of operating system (OS) software, where DP processors include an entirely different set program code. A gateway/firewall that includes multiple processors that may also communicate with a client device using a single communication path or socket. A socket is an endpoint implemented in software that establishes bidirectional communication between a program that communicates information between a computer or server and one or more client programs. A socket is known to associate a computer/server program with a specificlogical port on a machine where it runs such that a client program may communicate with a compute/server program over the socket that is associated with the port.

A client device, therefore, may not communicate simultaneously with a CP processor and an DP processor over the single communication pathway. Conventionally if a DP processor is used to authenticate a client device, program code associated with the DP processor must be overly complex because it must include all of the software required to authenticate a client device. Similarly, if a CP processor is used to authenticate a client device, the CP processor may be overloaded handling information relating to SSL virtual private network (VPN) data traffic transmitted between a computing resource and the client device after an authentication process has been completed. In either instance, the performance of the CP processor or the DP processor cannot be fully optimized using currently available multi-processor computing systems.

What is needed is a system and a method for optimizing the performance of CP processors and DP processors in a multi-processor system that does not require a DP processor to validate the credentials of a client device and that does not require a CP processor to administrate the transfer of data through a computing device.

SUMMARY OF THE PRESENTLY CLAIMED INVENTION

The present invention is generally related to a multi-processor system including at least a first processor executing software that is optimized for administrating the transfer of data and a second processor executing software that is optimized for performing control functions where the first processor acts as a proxy for the client device when the credentials of a client device are authenticated A client device attempting to gain access to resource on a computing network sends an authorization request a first processor in a gateway that includes a plurality of processors. After receiving the authorization request the first processor initiates a socket communication pathway to a second processor, and the first processor sends the authorization request to the second processor. After receiving the authorization request the second processor sends a corresponding request to an authentication server, and the authentication server responds by sending a response to the second processor.

After receiving the response from the authentication server the second processor sends a communication to the first processor using the socket pathway. After receiving the communication from the second processor the first processor forwards the communication to the client device. When the forwarded response authorizes communications between the client device and the computing resource the client device may communicate with the resource on the computer network.

Communications between the client device and the first processor may be communicated over a first network communication interface and communications between the second processor and the authorization server may be communicated over a second network communication interface. Communications between the first processor and the second processor may identify an internet protocol (IP) address and a port number of the client device. Communications transmitted through the gateway to the requested computing resource may be communicated through any network communication port at the gateway.

DETAILED DESCRIPTION

The present invention is generally related to a multi-processor system including at least a first processor executing software that is optimized for administrating the transfer of data and a second processor executing software that is optimized for performing control functions where the first processor acts as a proxy for the client device when the credentials of a client device are authenticated.

The present invention may use secure communications channels using the Secure Socket Layers (SSL) protocol, the Hypertext Transfer Protocol Secure (HTTPS) protocol (which employs the Secure Socket Layers (SSL) protocol, or the Internet Protocol Security (IPSec) protocol.

Figure 1:
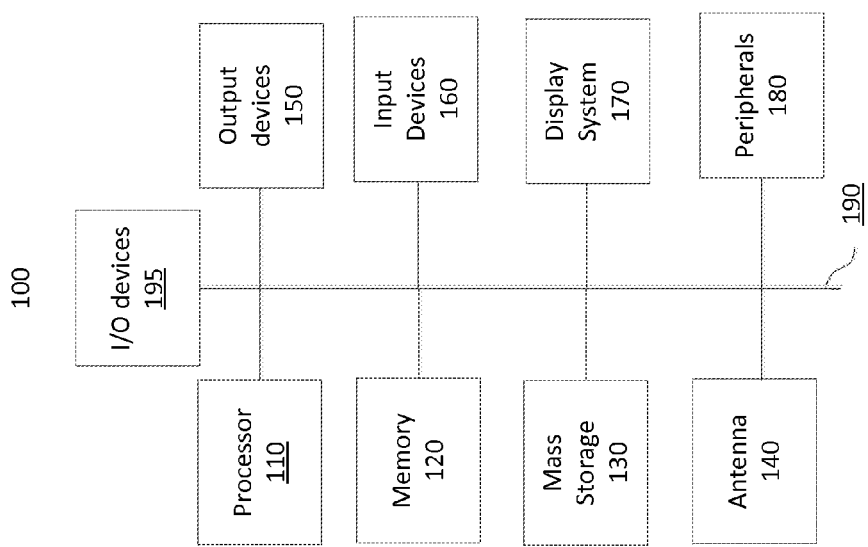
FIG. 1 illustrates a block diagram of a computing device that may be used to implement various embodiments of the present invention.

FIG. 1 illustrates a block diagram of a computing device that may be used to implement various embodiments of the present invention. FIG. 1 illustrates an exemplary computing system 100 that may be used to implement a computing device with the present technology. Note that FIG. 1 is exemplary and that all features shown in the figure may not be included in a gateway or a firewall implementing the present invention. System 100 of FIG. 1 may be implemented in the contexts of the likes of clients and servers. The computing system 100 of FIG. 1 includes one or more processors 110 and memory 120. Main memory 120 may store, in part, instructions and data for execution by processor 110. Main memory 120 can store the executable code when in operation. The system 100 of FIG. 1 further includes mass storage 130, which may include resident mass storage and portable storage, antenna 140, output devices 150, user input devices 160, a display system 170, peripheral devices 180, and I/O devices 195.

The components shown in FIG. 1 are depicted as being connected via a single bus 190. However, the components may be connected through one or more data transport means. For example, processor unit 110 and main memory 120 may be connected via a local microprocessor bus, and the storage 130, peripheral device(s) 180, and display system 170 may be connected via one or more input/output (I/O) buses.

Mass storage device 130, which may include mass storage implemented with a magnetic disk drive, an optical disk drive, FLASH memory, or be a portable USB data storage device. Mass storage device 130 can store the system software for implementing embodiments of the present invention for purposes of loading that software into main memory 120. The system software for implementing embodiments of the present invention may be stored on such a portable medium and input to the computer system 100 via the portable storage device.

Antenna 140 may include one or more antennas for communicating wirelessly with another device. Antenna 140 may be used, for example, to communicate wirelessly via Wi-Fi, Bluetooth, with a cellular network, or with other wireless protocols and systems. The one or more antennas may be controlled by a processor 110, which may include a controller, to transmit and receive wireless signals. For example, processor 110 executes programs stored in memory 120 to control antenna 140, transmit a wireless signal to a cellular network, and receive a wireless signal from the cellular network.

The system 100 as shown in FIG. 1 includes output devices 150 and input devices 160. Examples of suitable output devices include speakers, printers, and monitors. Input devices 160 may include a microphone, accelerometers, a camera, and other devices. Input devices 160 may also include an alpha-numeric keypad, such as a keyboard, for inputting alpha-numeric and other information, or a pointing device, such as a mouse, a trackball, stylus, or cursor direction keys. I/O devices 195 include network interfaces, and touch screens. Network interfaces used the present invention may be any computer network (wired or wireless) known in the art, including, yet are not limited to Ethernet, or 802.11.

Display system 170 may include a liquid crystal display (LCD), LED display, a plasma display, or be another suitable display device. Display system 170 receives textual and graphical information, and processes the information for output to the display device.

Peripherals 180 may include any type of computer support device to add additional functionality to the computer system. For example, peripheral device(s) 180 may include a modem or a router.

The components contained in the computer system 100 of FIG. 1 are those typically found in computing system, such as but not limited to a gateway, a firewall, a desktop computer, a laptop computer, a notebook computer, a netbook computer, a tablet computer, a smart phone, a personal data assistant (PDA), or other computer that may be suitable for use with embodiments of the present invention and are intended to represent a broad category of such computer components that are well known in the art. Thus, the computer system 100 of FIG. 1 can be a personal computer, hand held computing device, telephone, mobile computing device, workstation, server, minicomputer, mainframe computer, gateway, firewall, or any other computing device. The computer can also include different bus configurations, networked platforms, multi-processor platforms, etc. Various operating systems can be used including but not limited to Unix, Linux, Windows, Macintosh OS, Palm OS, Android OS, and Apple iOS.

Figure 2:
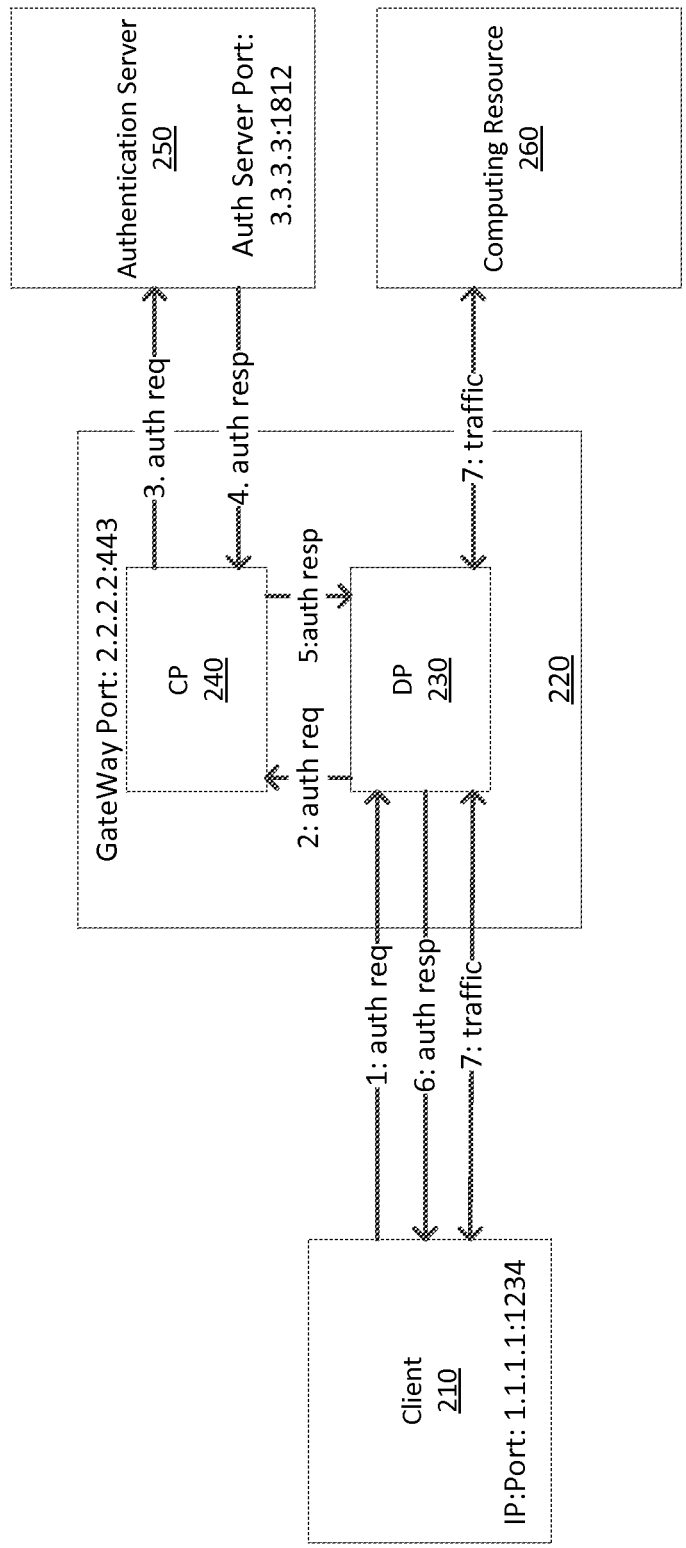
FIG. 2 illustrates a client device, a gateway, and authentication server communicating according to an exemplary methodology consistent with the disclosure of the present invention.

FIG. 2 illustrates a client device, a gateway, and authentication server communicating according to an exemplary methodology consistent with the disclosure of the present invention. The gateway 220 in FIG. 2 includes a first processor DP 230 and a second processor CP 240. The first processor DP 230 executes software out of memory that is optimized for communicating data between computing resource 260 on and the client device 210 after credentials of the client device 210 have been validated by authentication server 250. The second processor CP executes software out of memory that is optimized for control functions executed by the gateway. Software operating on the first processor DP 230 may communicate with the second processor CP 240 when the credentials of the client device are being validated. Processor DP230 may communicate with the second processor CP 240 using a socket or other remote procedure communication (RPC). The DP processor and the CP processor may be integrated within a single multi-processor package that include one or more silicon chips, i.e. dies where each chip/die may include one or more processors. The multi-processor package may be a multi-chip module. The multiple processors in gateway 220 may include one or more processors assembled into one or more packages and may include one or more multi-chip modules.

The gateway of FIG. 2 may communicate with an authentication server 250 when the credentials of a client device are being authenticated. After the credentials of a client device have been authenticated to access data on computing resource 260, data may be transmitted though the gateway 220 between the client device 210 and the computing resource 260.

FIG. 2 also includes a series of steps that may be performed according to an embodiment of the present invention. Client device 210 using an internet protocol address (IP) 1.1.1.1 communicates with the gateway 220 over port 1234 (i.e., IP address and port 1.1.1.1:1234) at the client device 210 and over a port at the gateway 220. The gateway in FIG. 2 uses IP address and port 2.2.2.2:443. The gateway 240 is depicted as communicating with an authentication server 250 over a second port at the gateway 240 and over a port at the authentication server 250. The IP address and port of the authentication server in FIG. 2 is 3.3.3.3:1812.

FIG. 2 illustrates the client device 210 sending an authorization request 1 to a DP processor 230 in gateway 220. The DP processor then forwards this authentication request 2 to the CP processor 240 in gateway 240, after which the CP processor 240 sends a corresponding authentication request 3 to the authentication server 250. In an embodiment of the invention the DP processor communicates with the CP processor using the IP address and port number of the client device. In this instance the DP processor acts as a transparent proxy for the client device. The CP processor may be entirely unaware that the DP processor is acting as a transparent proxy.

After the authentication server 250 has received the authentication request from the CP processor, the authentication server 250 sends an authentication response 4 to the CP processor, and then the CP processor sends the authentication response 5 to the DP processor 230. Next the DP processor forwards the authentication response 6 to the client device 210. When the authentication response 6 authorizes communications between the client device and the computing resource 260 data traffic 7 flow between the computing resource 260 and the client device 210 may occur according one or more access rules or other settings set in software executed by the DP processor 230.

Figure 3:
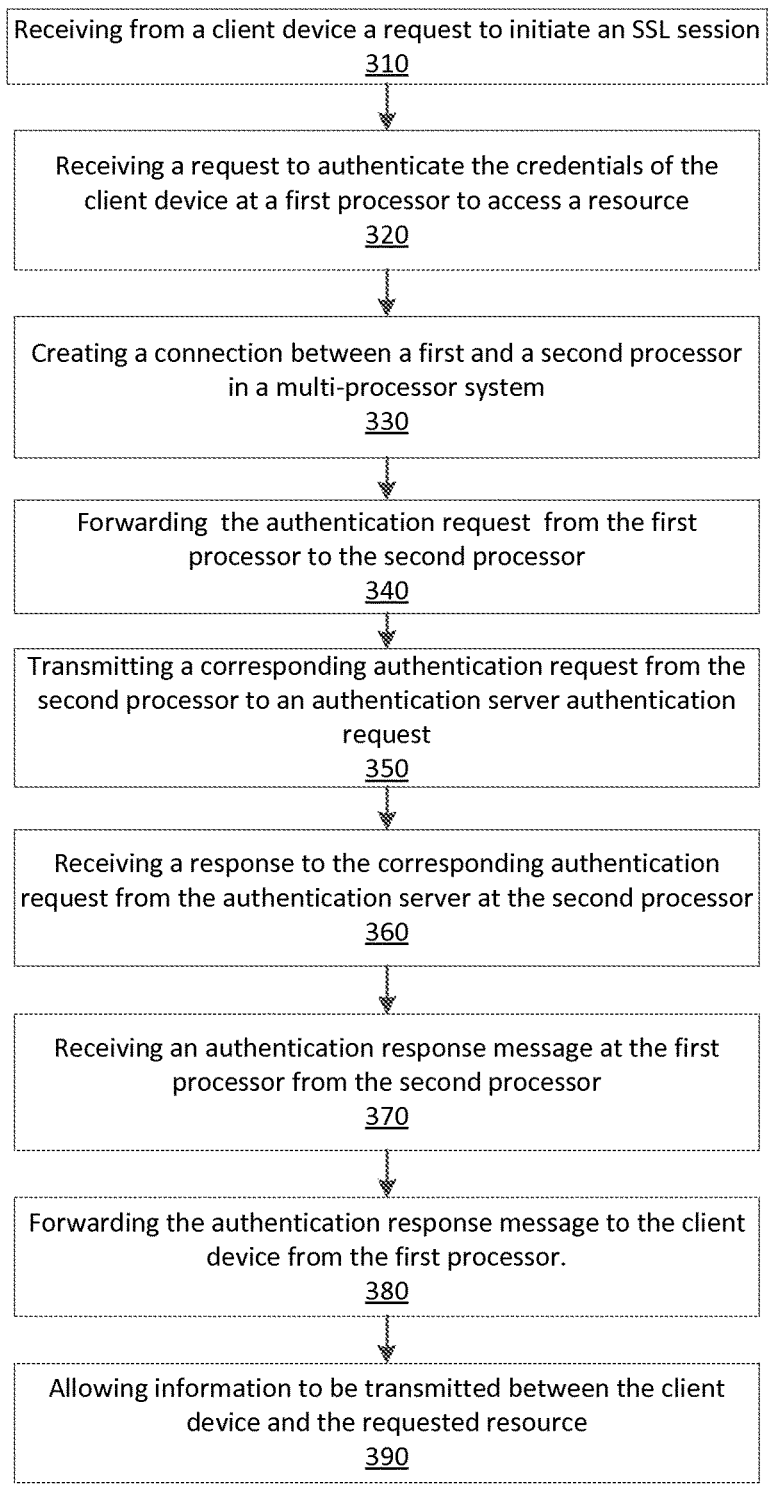
FIG. 3 illustrates a method of the present invention that may be implemented at a computing device including multiple processors in a computer network.

FIG. 3 illustrates a method of the present invention that may be implemented at a computing device including multiple processors in a computer network. Step 310 is where a processor in a computing device receives a request to initiate secure communications over a secure socket layer (SSL) session. In step 320, the first processor at the computing device receives a request from a client device to gain access to computing resources at a computing network. The request in step 320 may include one or more communications and may include credentials used to validate the authenticity of the client device or a user using the client device. The credentials provided by a client device may include, yet are not limited to a password, a user name, a security certificate, or other information provided by the client device.

In step 330 a connection is created between the first processor and a second processor at the computing device. The connection may be a socket connection where the first processor acts as a proxy for the client device by representing itself as the client device by using an IP address and a port number associated with the client device. The first processor may then forward the authentication request to the second processor using the IP address and the port number associated with the client device is step 340 of the flow chart. Then in step 350 the second processor transmits a corresponding authentication request to an authentication server over a second network communication interface. The authentication request transmitted to the authentication server in step 350 may include some or all of the authentication information provided by the client device.

Then in step 360 a response to the authentication request is received by the second processor, and in step 370 a corresponding response message is sent to the first processor. The corresponding response message sent to the first processor in step 370 may include the IP address and the IP port number of the client device. The first processor then forwards the corresponding response message to the client device in step 380 of the method of FIG. 3. In step 390 the client device and the requested resource communicate with each other through the computing device.

The various methods may be performed by software operating in conjunction with hardware. For example, instructions executed by a processor, the instructions otherwise stored in a non-transitory computer readable medium such as memory. Various interfaces may be implemented—both communications and interface. One skilled in the art will appreciate the various requisite components of a mobile device and integration of the same with one or more of the foregoing figures and/or descriptions.

While various embodiments have been described above, it should be understood that they have been presented by way of example only, and not limitation. The description are not intended to limit the scope of the presently claimed invention or to limit the scope of embodiments of the present invention. The present descriptions are intended to cover alternatives, modifications, and equivalents consistent with the spirit and scope of the disclosure.

The invention claim is:

1. A method for authorizing the access privileges of a client device, the method comprising:
   a computing device receiving an authorization request to access a computing resource on a computing network, wherein the computing device includes a plurality of processors, and the authorization request is received over a first network communication interface from the client device at a first processor of the plurality of processors;
   creating a communication pathway between the first processor and a second processor of the plurality of processors, wherein the communication pathway between the first processor and the second processor is a socket communication that associates a first set of program code with a second set of program code;

the first processor executing the first set of program code that admintistrates forwarding of information from the authorization request to the second processor in a communication, the communication identifying an internet protocol (IP) address and a port number associated with the client device;

the second processor executing the second set of program code that administrates the transmission of a request that corresponds to the authorization request to an authorization server;

receiving a response to the corresponding request from the authentication server by the second processor;

transmitting information from the received response over the communication pathway to the first processor in a second communication, wherein the second communication is from the second processor to the first processor, and the IP address and the port of the client device are identified by the second communication;

the first processor forwarding at least a portion of the information from the response to the client device over the first network computing interface; and allowing the client device to access the computing resource when information in the forwarded response indicates that the client device is authorized to access the computing resource.

2. The method of claim 1, wherein the first set of program code is optimized for managing the transfer of data, and the second set of program code is optimized for administrating control functions.

3. The method of claim 2, wherein the second set of program code includes operating system software.

4. The method of claim 1, wherein the corresponding request is transmitted over a second network communication interface to the authentication server, and the response received from the authentication server is received over the second network communication interface.

5. The method of claim 2, wherein the authentication server authenticates credentials of the client device by comparing information stored at the authentication server with the information from the corresponding request, and the response received from the authentication server indicates that the client device has been granted access to the requested computing resource.

6. A non-transitory computer readable storage medium having embodied thereon a program executable by one or more processors for authorizing the access privileges of a client device, the method comprising:

a computing device receiving an authorization request to access a computing resource on a computing network, wherein the computing device includes a plurality of processors, and the authorization request is received over a first network communication interface from a client device at a first processor of the plurality of processors;

creating a communication pathway between the first processor and a second processor of the plurality of processors, wherein the communication pathway between the first processor and the second processor is a socket communication that associates a first set of program code with a second set of program code;

the first processor executing the first set of program code that admintistrates forwarding of information from the authorization request to the second processor in a communication, the communication identifying an internet protocol (IP) address and a port number associated with the client device;

the second processor executing the second set of program code that administrates the transmission of a request that corresponds to the authorization request to an authorization server;

receiving a response to the corresponding request from the authentication server by the second processor;

transmitting information from the received response over the communication pathway to the first processor in a second communication, wherein the second communication is from the second processor to the first processor, and the IP address and the port of the client device are identified by the second communication;

the first processor forwarding at least a portion of the information from the response to the client device over the first network computing interface; and allowing the client device to access the computing resource when information in the forwarded response indicates that the client device is authorized to access the computing resource.

7. The non-transitory computer readable storage medium of claim 6, wherein the first set of program code is optimized for managing the transfer of data, and the second set of program code is optimized for administrating control functions.

8. The non-transitory computer readable storage medium of claim 7, wherein the second set of program code includes operating system software.

9. The non-transitory computer readable storage medium of claim 6, wherein the corresponding request is transmitted over a second network communication interface to the authentication server, and the response received from the authentication server is received over the second network communication interface.

10. The non-transitory computer readable storage medium of claim 7, wherein the authentication server authenticates credentials of the client device by comparing information stored at the authentication server with the information from the corresponding request, and the response received from the authentication server indicates that the client device has been granted access to the requested computing resource.

11. A system for authorizing the access privileges of a client device, the system comprising:

a memory;

a first processor;

a second processor; and a first network computing interface, wherein:

an authorization request to access a computing resource is received over the first network communication interface from a client device, and information in the authorization request includes information is received by a first processor, the first processor executing a first set of program code creates a communication pathway between the first processor and the second processor executing a second set of program code, the communication pathway between the first processor and the second processor is a socket communication that associates the first set of program code with the second set of program code, the first processor executing the first set of program code forwards the information from the authentication request in a communication over the communication pathway to the second processor, the forwarded communication identifies the internet protocol address and a port number associated with the client device, the second processor executing the second set of program code that administrates the transmission of a request that corresponds to the authorization request to an authorization server, the second processor receives a response to the corresponding request from the authentication server, the second processor administrates the transmission of information from the received response over the communication pathway to the first processor in a second communication, wherein the second communication is from the second processor to the first processor, and the IP address and the port of the client device are identified by the second communication, the first processor forwards at least a portion of the information from the response to the client device over the first network computing interface, and the client device is allowed to access the computing resource when information in the forwarded response indicates that the client device is authorized to access the computing resource.

12. The system of claim 11, wherein the first set of program code is optimized for managing the transfer of data, and the second set of program code is optimized for administrating control functions.

13. The system of claim 12, wherein the second set of program code includes operating system software.

14. The system of claim 12, further comprising a second network communication interface, wherein the corresponding request is transmitted over the second network communication interface to the authentication server, and the response received from the authentication server is received over the second network communication interface.

15. The system of claim 12, wherein the authentication server authenticates credentials of the client device by comparing information stored at the authentication server with the information from the corresponding request, and the response received from the authentication server indicates that the client device has been granted access to the requested computing resource.

* * * * *